United States Patent Office 2,742,507
Patented Apr. 17, 1956

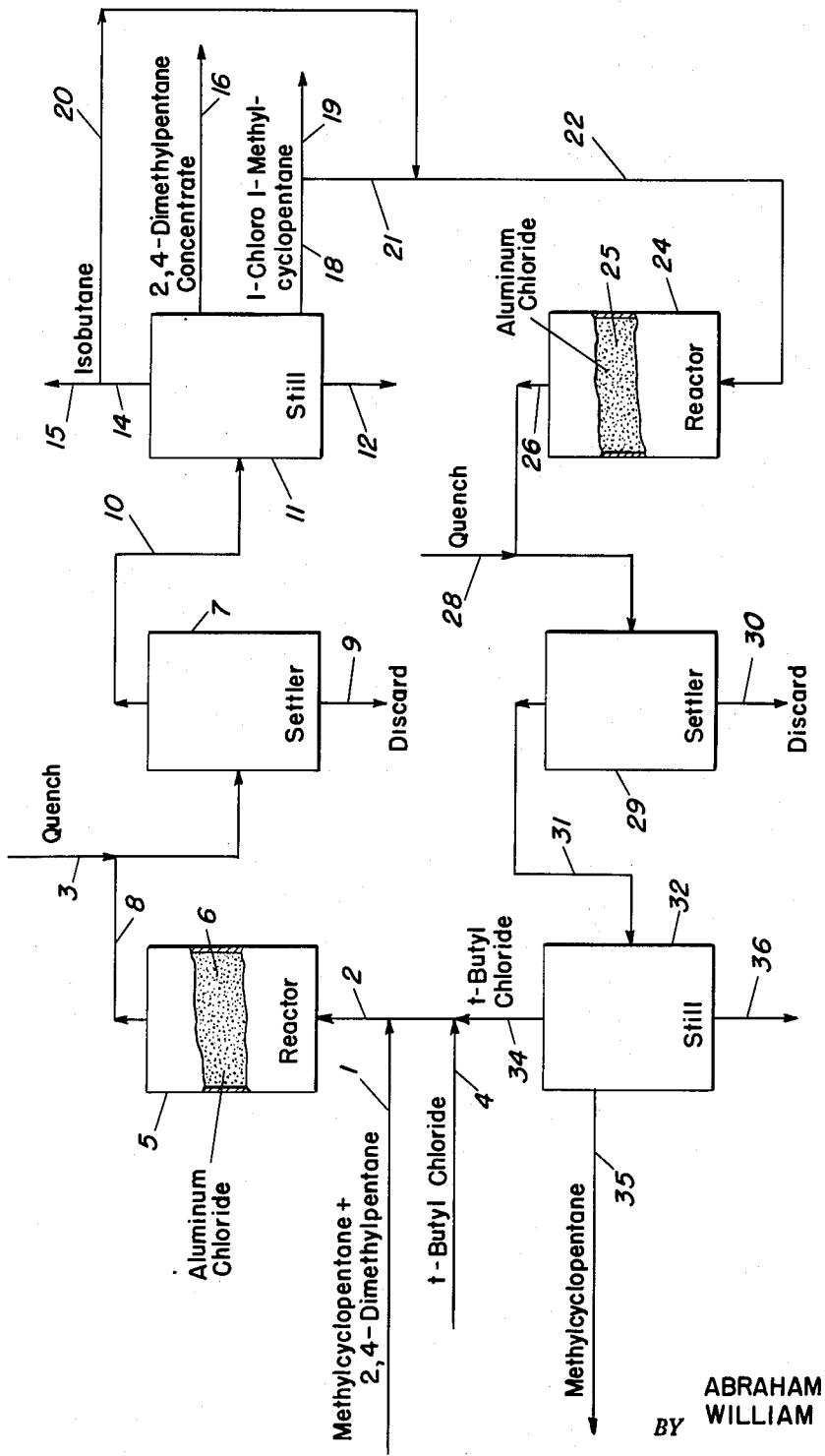

2,742,507

SEPARATION OF HYDROCARBONS

Abraham Schneider, Philadelphia, and William K. Conn, Drexel Hill, Pa., assignors to Sun Oil Company, Philadelphia, Pa., a corporation of New Jersey Application February 28, 1952, Serial No. 273,802

5 Claims. (Cl. 260—648)

This invention relates to the separation of cyclopentanes from other saturated hydrocarbons. More specifically, the invention relates to the separation of cyclopentanes having at least one tertiary carbon atom from other saturated hydrocarbons having at least one tertiary carbon atom.

Mixtures of saturated hydrocarbons are difficult to separate when the components thereof boil within a narrow range, since it is difficult or impossible to use fractional distillation in such instance. Such mixtures occur in nature and are produced by various hydrocarbon conversion and synthesis processes. For example, mixtures of saturated hydrocarbons are derived from natural or straight run gasoline, and from the products of hydrocarbon cracking, alkylation, dehydrogenation, and other reactions by treating the products thereof to remove unsaturated compounds such as olefins, acetylenes, and aromatic hydrocarbons.

A process for the separation of saturated hydrocarbons having a tertiary carbon atom from other saturated hydrocarbons not having a tertiary carbon atom has heretofore been described. This described process is apparently based on the greater reactivity of the hydrocarbon having a tertiary carbon atom as compared to hydrocarbons having only primary and secondary carbon atoms. A commercially feasible process for the separation of hydrocarbon types wherein at least two of such types have tertiary carbon atoms has not heretofore been described.

An object of the present invention is to provide a process for the separation of saturated hydrocarbons having a ring composed of five carbon atoms and at least one tertiary carbon atom per molecule from other saturated hydrocarbons also having at least one tertiary carbon atom per molecule. A specific object of the present invention is to separate cyclopentanes having at least one tertiary carbon atom from other hydrocarbons also having at least one tertiary carbon atom. Another object of the invention is to treat a narrow boiling range mixture or a wide boiling range mixture of saturated hydrocarbons containing cyclopentanes having at least one tertiary carbon atom and other saturated hydrocarbons having at least one tertiary carbon atom to separate therefrom said cyclopentanes. A further object of the present invention is to separate alkyl substituted cyclopentanes from other saturated hydrocarbons. Other objects will be apparent from the following description of the invention.

It has now been found that by subjecting a mixture of saturated hydrocarbons containing at least one cyclopentane having a tertiary carbon atom with other hydrocarbons also having a tertiary carbon atom to the action of an alkyl halide and a Friedel-Crafts catalyst under conditions hereinafter described, the cyclopentane and alkyl halide undergo a selective hydrogen-halogen exchange reaction, whereby the cyclopentane is converted to a substantially higher boiling alkyl halide and the alkyl halide reactant is converted to the corresponding paraffin. Specifically, the halogen atom of the alkyl halide is exchanged for the hydrogen atom attached to the tertiary carbon atom of the cyclopentane to form a tertiary cyclopentyl halide and the paraffin corresponding to the original alkyl halide reactant. Because of its relatively high boiling point, the so-formed alkyl halide is readily separable from the reaction mixture. If desired, the separated alkyl halide may be easily converted to the original cyclopentane as hereinafter described. It is preferred to select the alkyl halide reactant so that the corresponding hydrocarbon formed therefrom in the present process does not interfere with the separation of the alkyl halide product.

The process of the present invention may be employed with any mixture of saturated hydrocarbons containing at least one cyclopentane having at least one tertiary carbon atom and at least one other saturated hydrocarbon also having at least one tertiary carbon atom. For example, mono-, di-, and tri-alkyl substituted cyclopentanes having at least one tertiary carbon atom may be separated from isoparaffins and alkyl substituted cyclohexanes also having at least one tertiary carbon atom. The separation may be accomplished from admixtures of pure compounds, such as an admixture of methylcyclopentane and isopentane, or from narrow boiling hydrocarbon fractions, or from widely boiling hydrocarbon fractions. For example, methylcyclopentane may be separated from 3-methylpentane, from 2,3-dimethylpentane, or from mixtures thereof; n-propylcyclopentane may be separated from ethylcyclohexane; isopropylcyclopentane may be separated from 1,2-dimethylcyclohexane; 1,1,3-trimethylcyclopentane may be separated from 1,3- or 1,4-dimethylcyclohexane, or mixtures thereof; ethylcyclopentane may be separated from 2,2,4-trimethylpentane; 1,3-dimethylcyclopentane or 1,2-dimethylcyclopentane, or mixtures thereof, may be separated from 2-methylhexane or 2,3-dimethylpentane; and 1,2,4-trimethylcyclopentane may be separated from 2,3,4-trimethylpentane. Any of the above or other alkyl substituted cyclopentanes having at least one tertiary carbon atom may be separated from any of the above or other isoparaffins or cyclohexanes having at least one tertiary carbon atom, or mixtures thereof. Saturated hydrocarbons which do not have a tertiary carbon atom are inert in the present process and hence act as diluents. It is preferred to employ the process of the present invention with a charge stock composed of a mixture of hydrocarbons having at least 5% by volume of cyclopentanes having at least one tertiary carbon atom and at least 5% by volume of other hydrocarbons having at least one tertiary carbon atom. The present process is especially useful with a charge stock containing from about 10 to 90 parts by volume of cyclopentanes having at least one tertiary carbon atom and about 90 to 10 parts by volume of other saturated hydrocarbons having at least one tertiary carbon atom, the remainder, if any, consisting of saturated hydrocarbons having only primary and secondary carbon atoms.

The alkyl halide to employ is preferably a tertiary alkyl halide wherein the halogen is chlorine or bromine, but secondary alkyl chlorides or bromides may be employed if desired. Preferred alkyl halides to employ are illustrated by tertiary butyl chloride, 2-methyl-2-chlorobutane, 2-methyl-2-chloropentane, 3-methyl-3-chloropentane, 2,4-dimethyl-2-chloropentane, isopropyl chloride, cyclopentyl chloride, cyclohexyl chloride, the bromine analogues thereof and homologues and isomers thereof. It is preferred to employ and alkyl halide which, when converted to the corresponding paraffin in the present process, has a boiling point outside of the boiling range of other components the separation of which is desired.

Aluminum chloride is the preferred catalyst to employ, but other Friedel-Crafts type metal halide catalysts, such as stannic chloride, zinc chloride, ferric chloride, and aluminum bromide may also be employed. The various catalysts are not necessarily equivalent in the process, and reaction conditions may be adjusted in accordance with the particular catalyst used to obtain good results. For ease of recovery, it is preferred to employ a catalyst wherein the halogen is the same as the halogen of the alkyl halide. For example, aluminum chloride is the preferred catalyst to employ when using tertiary butyl chloride as the alkyl halide. The quantity of catalyst to employ is a catalytic quantity sufficient to achieve the desired reaction and will vary according to the catalyst, alkyl halide and residence time employed; the exact quantity to employ in a given application may be readily determined by one skilled in the art.

It is essential to the successful operation of the present process that the ratio of alkyl halide to cyclopentane be maintained below about 0.9, since higher ratios cause undesired side reactions, such as a halogen-hydrogen exchange between the alkyl halide and the tertiary carbon atom of hydrocarbons other than the cyclopentane. The preferred mole ratio of alkyl halide to cyclopentane is from 0.1:1 to 0.75:1; with lower ratios the amount of reaction is insufficient to merit commercial application, whereas with higher ratios undesired side reactions are observed. It is also essential to the successful operation of the present process that the temperature be maintained below 50° C., and preferably below 40° C., since higher temperatures cause undesired side reactions. The preferred temperature range to employ is from 0 to 40° C. although lower temperatures down to about −20° C. may be employed. Pressure is not critical and atmospheric, sub-atmospheric or super-atmospheric pressure may be employed. Since the present reaction is preferably performed in the liquid phase, the preferred pressure is that which is sufficient to maintain the components of the reaction in the liquid phase.

The present reaction is rapid, and a long contact time between the reactants and catalyst should be avoided, since excessive contact results in undesired side reactions. Time of contact is preferably within the range of 0.05 to 10 minutes.

To illustrate the process of the present invention, a mixture composed of about equal parts of ethylcyclopentane and methylcyclohexane is admixed with a quantity of tertiary butyl chloride so that the mole ratio of tertiary butyl chloride to ethylcyclopentane is from 0.1:1 to 0.75:1. This admixture is passed through a bed of aluminum chloride at a temperature of from 0 to 40° C. while maintaining the rate of flow so that residence time is from about 1 to 10 minutes. The pressure during contact of the reactants with catalyst is adjusted to maintain the reactants in liquid state. The effluent from the catalyst chamber contains 1-chloro-1-ethylcylopentane and isobutane, which compounds are the reaction products of the hydrogen-halogen exchange reaction between ethylcyclopentane and tertiary butyl chloride. The remaining components of the reaction mixture consist of unreacted ethylcyclopentane, unreacted tertiary butyl chloride, methylcyclohexane and a minor quantity of products from side reactions. This effluent is passed to a distillation operation wherein the components therein are separated. A concentrate of methylcyclohexane constitutes a product. Another product is 1-chloro-1-ethylcylopentane, which compound may be employed as a chemical intermediate in the preparation of other cyclopentane derivatives, such as 1-ethyl-1-cyclopentanol and 1-ethyl-1-cyclopentene. It is preferred to convert this compound to ethylcyclopentane, and this may be conveniently accomplished by subjecting it to a hydrogen-halogen exchange reaction similar to that employed for its formation, except in this step it is preferred to employ a mole ratio of alkyl halide to tertiary hydrocarbon of at least 1:1, and preferably from 1:1 to 1:10. This may be accomplished by contacting the 1-chloro-1-ethylcyclopentane and isobutane with a Friedel-Crafts type metal halide catalyst, which is preferably aluminum chloride. The isobutane is advantageously that which is recovered in the separation step above described and which was derived from the original tertiary butyl chloride. An additional quantity of isobutane from an external source may be employed if necessary. The principal products of this reaction are ethylcyclopentane and tertiary butyl chloride, which materials are easily separable by distillation, ethylcyclopentane being recovered as a product and tertiary butyl chloride being recycled to the process. In general, the conditions employed in the hydrogen-halogen exchange reaction are advantageously the same as the conditions employed in the preparation of 1-chloro-1-ethylcyclopentane, the components of reaction being maintained in the liquid phase.

The accompanying flow diagram shows schematically one arrangement of apparatus, elements and the flow of materials therethrough which may be employed in practicing an embodiment of the present process. A mixture of methylcyclopentane and 2,4-dimethylpentane is employed to illustrate the various charge stocks with which the present process is operable. Tertiary butyl chloride is employed to illustrate the various tertiary and secondary alkyl halides which may be employed, and aluminum chloride is employed as illustrative of the preferred Friedel-Crafts type metal halide catalyst. The charge stock is introduced to the process through line 1 and is admixed in line 2 with tertiary butyl chloride introduced through line 4 prior to introduction into reactor 5. Reactor 5 is packed with aluminum chloride 6. Within reactor 5, a halogen-hydrogen exchange reaction between methylcyclopentane and tertiary butyl chloride occurs, while 2,4-dimethylpentane remains unaffected. The size of reactor 5 and the throughput of the reaction mixture are selected so that residence time of the reaction mixture within reactor 5 is from about 1 to 10 minutes. The temperature within reactor 5 is maintained from 0 to 40° C., and a pressure sufficient to maintain liquid phase reaction is employed. Frequently a small quantity of aluminum chloride becomes entrained in the stream of reactants, so that quenching of the reaction, such as by introducing water through line 3 into the effluent 8 from reactor 5 is desirable. Settler 7 is provided to separate the water and hydrocarbon layers, the water being discarded through line 9. Effluent from settler 7 passes through line 10 to still 11 wherein components thereof are separated. Undesired side products, if any, are removed through line 12. Isobutane is removed through line 14 and may be recovered as a product of the process through line 15; 2,4-dimethylpentane is recovered as a product through line 16, and 1-chloro-1-methylcyclopentane is recovered as a product through lines 18 and 19. Preferably, however, isobutane and 1-chloro-1-methylcyclopentane are admixed by passage through lines 20 and 21, respectively, into line 22. The resulting admixture is passed through reactor 24 which is packed with aluminum chloride 25. In reactor 24, a hydrogen-halogen exchange occurs between the isobutane and 1-chloro-1-methylcyclopentane forming tertiary butyl chloride and methylcyclopentane, which latter compounds form the principal components of the effluent removed from reactor 24 passing through line 26. Operable conditions of time, temperature, pressure and residence time are as stated for reactor 5, and are selected to maintain the reactants in liquid phase. In the event aluminum chloride is entrained in the effluent from reactor 24, it is advantageous to quench the reaction such as by adding water through line 28. Settler 29 is provided to separate the water layer, which is removed through line 30, and the hydrocarbon layer, which is removed through line 31 and passed to still 32 wherein the components are separated by fractionation. Tertiary butyl chloride is removed from still 32 through line 34 and is recycled to the process through line 2. Methylcyclopentane is recovered as a product through line 35. A small quantity of other products, if any, including any unreacted 1-chloro-1-methylcyclopentane, is removed from the process through line 36.

For simplicity, elements of apparatus such as pumps, valves, heat exchangers, control means, and the like, the location and use of which is within the skill of the art, have been omitted. Also, it will be apparent that if desirable or necessary, fresh aluminum chloride may be continuously or intermittently introduced into the reactors, or standby reactors may be employed so that regeneration or replacement of the catalyst may be accomplished without stopping the process.

The following examples are included to illustrate embodiments of the present invention. In the examples, "parts" refers to parts by weight unless otherwise specified.

Example 1

To a reactor charged with 1 part of anhydrous aluminum chloride was added a mixture consisting of 8.4 parts of methylcyclopentane, 21.8 parts of isopentane and 4.6 parts of t-butyl chloride, the mole ratio of t-butyl chloride to methylcyclopentane being 0.5. After agitation for 4 minutes at about 27° C., the reaction was quenched by addition of water to the reactor. The organic layer was separated, dried and separated into components by fractionation.

There were recovered, in mole per cent of theoretical based on t-butyl chloride, 32% isobutane and 14% 1-chloro-1-methylcyclopentane, and in weight per cent of the starting component, 100% isopentane, 46% t-butyl chloride and 88% methylcyclopentane.

Example 2

Example 1 was repeated except that 29.4 parts of methylcyclohexane was substituted for isopentane, and a contact time of 10 minutes was employed.

There were recovered, in mole per cent of theoretical based on t-butyl chloride, 69% isobutane and 30% 1-chloro-1-methylcyclopentane, and in weight per cent of the starting component, 100% methylcyclohexane, 35% t-butyl chloride and 51% methylcyclopentane.

Example 3

To a reactor charged with 1 part of anhydrous aluminum chloride was added a mixture consisting of 7.2 parts of isopentane, 29.4 parts of methylcyclohexane and 4.6 parts of t-butyl chloride. The procedure of Example 1 was duplicated except that the time of contact employed was 10 minutes.

There were recovered, in mole per cent of theoretical, 80% isobutane, 15% t-amyl chloride, and 40% 1-chloro-1-methylcyclohexane, and in weight per cent of the starting component, 9% t-butyl chloride, 75% isopentane and 86% methylcyclohexane.

Examples 1 and 2 show a rapid and highly selective hydrogen-halogen exchange reaction between a cyclopentane having a tertiary carbon atom and a tertiary alkyl chloride, under the conditions of the present process, the reaction being sufficiently selective to preclude reaction between the tertiary alkyl chloride and other saturated hydrocarbons also having a tertiary carbon atom. Example 3 shows simultaneous and non-selective reaction of saturated hydrocarbons having a tertiary carbon atom, in the absence of a cyclopentane having a tertiary carbon atom, in a process otherwise identical to the present process.

When other cyclopentanes having a tertiary carbon atom, alkyl halides and Friedel-Crafts catalyst within the scope of the present invention, as herein defined, are employed, substantially identical results are obtained. It will be apparent that the present process may be operated batchwise or as a continuous operation. As above stated, the process of the present invention is employed with mixtures of saturated hydrocarbons. Unsaturated hydrocarbons, such as olefins, acetylenes and aromatics should be substantially absent, but a small quantity thereof which may be present as an impurity, say up to about 2%, does not deleteriously affect the process to a substantial extent.

The invention claimed is:

1. Process of separating methylcyclopentane from admixture with 2,4-dimethylpentane which comprises contacting for from 0.05 to 10 minutes said admixture with a tertiary alkyl chloride in the presence of aluminum chloride at a temperature of from 0° C. to 40° C., wherein the mole ratio of said alkyl halide to methylcyclopentane is from 0.1:1 to 0.9:1, to effect as the principal reaction a hydrogen-halogen exchange between said methylcyclopentane and said alkyl chloride whereby said methylcyclopentane is converted to 1-chloro-1-methylcyclopentane and said first mentioned alkyl chloride is converted to the corresponding tertiary hydrocarbon, separating from the reaction mixture as a product said 2,4-dimethylpentane, separating from the reaction mixture said 1-chloro-1-methylcyclopentane and said hydrocarbon corresponding to the first mentioned akyl chloride, admixing said separated 1-chloro-1-methylcyclopentane and said separated hydrocarbon corresponding to the first mentioned alkyl chloride in the presence of aluminum chloride at a temperature of from 0° C. to 40° C. for a limited time to effect as the principal reaction a hydrogen-halogen exchange whereby said 1-chloro-1-methylcyclopentane is converted to methylcyclopentane, and separating the methylcyclopentane from the reaction mixture.

2. Process of separating methylcyclopentane from admixture with 2,4-dimethylpentane which comprises contacting for from 0.05 to 10 minutes said admixture with tertiary butyl chloride in the presence of aluminum chloride at a temperature of from 0° C. to 40° C., wherein the mole ratio of tertiary butyl chloride to methylcyclopentane is from 0.1:1 to 0.75:1, to effect as the principal reaction a hydrogen-halogen exchange between methylcyclopentane and tertiary butyl chloride whereby said methylcyclopentane is converted to 1-chloro-1-methylcyclopentane and said tertiary butyl chloride is converted to isobutane, separating from the reaction mixture as a product said 2,4-dimethylpentane, separating from the reaction mixture said 1-chloro-1-methylcyclopentane and isobutane, admixing said separated 1-chloro-1-methylcyclopentane and said isobutane, contacting in the liquid phase said last mentioned admixture with aluminum chloride at a temperature of from 0° C. to 40° C. to effect as a principal reaction a hydrogen-halogen exchange, whereby said 1-chloro-1-methylcyclopentane is converted to methylcyclopentane and said isobutane is converted to tertiary butyl chloride, and separating methylcyclopentane from the reaction mixture.

3. Process of separating methylcyclopentane from admixture with 2,4-dimethylpentane which comprises contacting for from 0.05 to 10 minutes said admixture with a tertiary alkyl chloride in the presence of a Friedel-Crafts catalyst selected from the group consisting of aluminum chloride, stannic chloride, zinc chloride, ferric chloride and aluminum bromide at a temperature of from 0° C. to 40° C., wherein the mole ratio of said alkyl halide to methylcyclopentane is from 0.1:1 to 0.9:1, to effect as the principal reaction a hydrogen-halogen exchange between said methylcyclopentane and said alkyl chloride whereby said methylcyclopentane is converted to 1-chloro-1-methylcyclopentane and said first mentioned alkyl chloride is converted to the corresponding tertiary hydrocarbon, separating from the reaction mixture as a product said 2,4-dimethylpentane, and separating from the reaction mixture said 1-chloro-1-methylcyclopentane and said hydrocarbon corresponding to the first mentioned alkyl chloride.

4. Process of separating methylcyclopentane from admixture with 2,4-dimethylpentane which comprises contacting for from 0.05 to 10 minutes said admixture with tertiary butyl chloride in the presence of a Friedel-Crafts catalyst selected from the group consisting of aluminum chloride, stannic chloride, zinc chloride, ferric chloride and aluminum bromide at a temperature of from 0° C. to 40° C., wherein the mole ratio of tertiary butyl chloride to methylcyclopentane is from 0.1:1 to 0.75:1, to effect as the principal reaction a hydrogen-halogen exchange between methylcyclopentane and tertiary butyl chloride whereby said methylcyclopentane is converted to 1-chloro-1-methylcyclopentane and said tertiary butyl chloride is converted to isobutane, separating from the reaction mixture as a product said 2,4-dimethylpentane and separating from the reaction mixture said 1-chloro-1-methylcyclopentane and isobutane.

5. Process of separating a material selected from the group consisting of methylcyclopentane, n-propylcyclopentane, isopropylcyclopentane, 1,2,3-trimethylcyclopentane, ethylcyclopentane, 1,3-dimethylcyclopentane, 1,2-dimethylcyclopentane, and 1,2,4-trimethylcyclopentane from an admixture thereof with a material selected from the group consisting of isoparaffins having a tertiary carbon atom and alkyl cyclohexanes having a tertiary carbon atom, the material selected from said last mentioned group having a boiling point approximately the same as the boiling point of the material selected from said first mentioned group, which comprises contacting said admixture with a tertiary alkyl chloride in the presence of a Friedel-Crafts catalyst selected from the group consisting of aluminum chloride, stannic chloride, zinc chloride, ferric chloride and aluminum bromide at a temperature of from 0° C. to 40° C., wherein the mole ratio of said alkyl chloride to the material selected from said first mentioned group is from 0.1:1 to 0.9:1, to effect as the principal reaction a hydrogen-halogen exchange between the material selected from said first mentioned group and said alkyl chloride whereby the material from said first mentioned group is converted to a 1-chloro-1-alkylcyclopentane and said first mentioned alkyl chloride is converted to the corresponding hydrocarbon, separating from the reaction mixture as a product the material selected from said last mentioned group, and separating from the reaction mixture said 1-chloro-1-alkylcyclopentane and said hydrocarbon corresponding to the first mentioned alkyl chloride.

References Cited in the file of this patent

UNITED STATES PATENTS

| | | |
|---|---|---|
| 2,448,156 | Schmerling | Apr. 27, 1944 |
| 2,474,827 | Condon | July 5, 1949 |
| 2,646,453 | Condon | July 21, 1953 |

OTHER REFERENCES

Bartlett et al.: "Jour. Am. Chem. Soc.," vol. 66, pp. 1531–9 (1944).